United States Patent
Shtivi et al.

(10) Patent No.: US 11,050,748 B2
(45) Date of Patent: Jun. 29, 2021

(54) WEB-BASED AUTHENTICATION FOR NON-WEB CLIENTS

(71) Applicant: CyberArk Software Ltd., Petach-Tikva (IL)

(72) Inventors: Elad Shtivi, Petach-Tikva (IL); Shlomi Benita, Petach-Tikva (IL); Yaron Nisimov, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 254 days.

(21) Appl. No.: 15/920,103

(22) Filed: Mar. 13, 2018

(65) Prior Publication Data

US 2019/0289005 A1      Sep. 19, 2019

(51) Int. Cl.
*H04L 29/06* (2006.01)
*H04L 12/46* (2006.01)
(Continued)

(52) U.S. Cl.
CPC .......... *H04L 63/0884* (2013.01); *G06F 9/452* (2018.02); *G06F 9/45533* (2013.01);
(Continued)

(58) Field of Classification Search
CPC ............. H04L 63/0884; H04L 12/4633; H04L 63/102; H04L 67/42; G06F 21/53;
(Continued)

(56) References Cited

U.S. PATENT DOCUMENTS

| 8,701,199 B1* | 4/2014 | Dotan | H04L 63/08 726/25 |
| 2005/0044197 A1* | 2/2005 | Lai | G06Q 10/10 709/223 |

(Continued)

OTHER PUBLICATIONS

Bersenev et al. "An approach for integrating kerberized non web-based services with web-based identity federations", 2015 10th International Joint Conference on Software Technologies (ICSOFT), Date of Conference: Jul. 20-22 (Year: 2015).*

(Continued)

*Primary Examiner* — Morshed Mehedi
(74) *Attorney, Agent, or Firm* — Finnegan, Henderson, Farabow, Garrett & Dunner, LLP

(57) ABSTRACT

Systems and methods are provided for providing web-based authentication for non-web based clients. The systems and methods include receiving, from a non-web based client, a request to connect to a target resource and invoking a web navigation application. The web navigation application can execute remotely from the client on a server and a display of the web navigation application can be provided to the non-web based client. The web navigation application can be directed to an identity provider an can receive, from the client, in response to the display of the web navigation application, authentication information. The web navigation application can receive, from the identity provider, a result of an authentication of the client based on the authentication information. Whether to permit the requested connection to the target resource can then be determined based on the result of the authentication of the client.

20 Claims, 4 Drawing Sheets

(51) Int. Cl.
*G06F 9/451* (2018.01)
*G06F 9/455* (2018.01)
*G06F 21/53* (2013.01)

(52) U.S. Cl.
CPC .......... *G06F 21/53* (2013.01); *H04L 12/4633* (2013.01); *H04L 63/102* (2013.01); *G06F 2221/2149* (2013.01); *H04L 67/42* (2013.01)

(58) Field of Classification Search
CPC ................ G06F 9/45533; G06F 9/452; G06F 2221/2149; G06F 21/41
See application file for complete search history.

(56) References Cited

U.S. PATENT DOCUMENTS

| | | | | |
|---|---|---|---|---|
| 2011/0184993 | A1* | 7/2011 | Chawla | G06F 9/45533 707/802 |
| 2012/0216244 | A1* | 8/2012 | Kumar | G06F 21/57 726/1 |
| 2014/0298413 | A1* | 10/2014 | Anderson | H04L 63/08 726/3 |
| 2014/0344402 | A1* | 11/2014 | Tivey | H04L 67/141 709/217 |
| 2017/0199770 | A1* | 7/2017 | Peteva | G06F 9/5088 |
| 2019/0068578 | A1* | 2/2019 | Balakrishnan | H04L 67/02 |
| 2019/0097802 | A1* | 3/2019 | Rowe | H04L 63/0884 |

OTHER PUBLICATIONS

"A PAM module (using pam-script) which validates SAML assertions given as password (inspired by crudesaml)," retrieved from https://github.com/ck-ws/pam-script-saml on Mar. 13, 2018.

* cited by examiner

WEB-BASED AUTHENTICATION FOR NON-WEB CLIENTS

BACKGROUND

Organizations and service providers like LEANKIT, SALESFORCE, PVWA are increasingly relying on central systems such as OKTA, MICROSOFT ADFS, AWS to provide authentication services. These central systems can rely on web-based authentication protocols like SAML 2.0, OAuth 2.0, and OpenID. But Unix and Linux systems use non-web-based local authentication systems and therefore may not support web-based federated authentication. Thus these systems may potentially require users to have both local authentication credentials and central authentication credentials. Existing alternative approaches allow authentication using the result of the SAML authentication, the SAML assertion, but this solution requires authentication with the identity provider by the client from the local workstation before attempting to connect to the server.

Consequently, systems and methods are needed for enabling web-based federated authentication using non-web-based clients. Technological solutions are needed for achieving this capability in networks with some or all non-web based clients.

SUMMARY

It is to be understood that both the foregoing general description and the following detailed description are exemplary and explanatory only and are not restrictive of the disclosed embodiments, as claimed. The disclosed embodiments enable web-based federated authentication using non-web-based clients. In some embodiments, such authentication can be enabled by using a remote access protocol to connect to a local authentication service. This local authentication service can invoke a navigation application. The navigation application can contact the login page of an identity provider, which can be reflected to the client, enabling the client to perform web-based authentication over the remote access protocol.

Disclosed embodiments include a non-transitory computer readable medium including instructions. When executed by at least one processor, the instructions can cause the at least one processor to perform operations for providing web-based authentication for non-web based clients. The operations can include receiving, from a non-web based client, a request to connect to a target resource. The operations can further include invoking a web navigation application. The operations can also include providing a display of the web navigation application to the client. The web navigation application can execute remotely from the client on a server. The operations can further include directing the web navigation application to an identity provider and receiving, from the client, in response to the display of the web navigation application, authentication information. The operations can also include receiving, from the identity provider, a result of an authentication of the client based on the authentication information and determining, based on the result of the authentication of the client, whether to permit the requested connection to the target resource.

Disclosed embodiments also include a computer-implemented method for providing web-based authentication for non-web based clients. The method can include receiving, from a non-web based client, a request to connect to a target resource. The method can also include invoking a web navigation application and providing a display of the web navigation application to the client. The web navigation application can execute remotely from the client on a server. The method can further include directing the web navigation application to an identity provider and receiving, from the client, in response to the display of the web navigation application, authentication information. The method can also include receiving, from the identity provider, a result of an authentication of the client based on the authentication information and determining, based on the result of the authentication of the client, whether to permit the requested connection to the target resource.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings are not necessarily to scale or exhaustive. Instead, emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings.

While some remote access clients may use hypertext transfer protocol (HTTP) to connect with authentication servers (e.g., OAuth 2.0), other remote access clients may rely on other protocols. For example, some remote access clients may use the secure shell protocol (SSH) to establish a secure connection to a server. As an additional example, remote desktop protocol (RDP) uses a propriety protocol for connecting with another computer. Further, remote access clients may engage in tunneling or reverse tunneling to connect with another computer. Remote access clients may utilize standardized protocols (e.g., RFC 4253 or RFC 4254 for SSH, RFC 3024 for reverse tunneling, etc.) or proprietary protocols. As used herein, remote access clients that do not connect using HTTP are described as non-web remote access clients.

Figure 1:
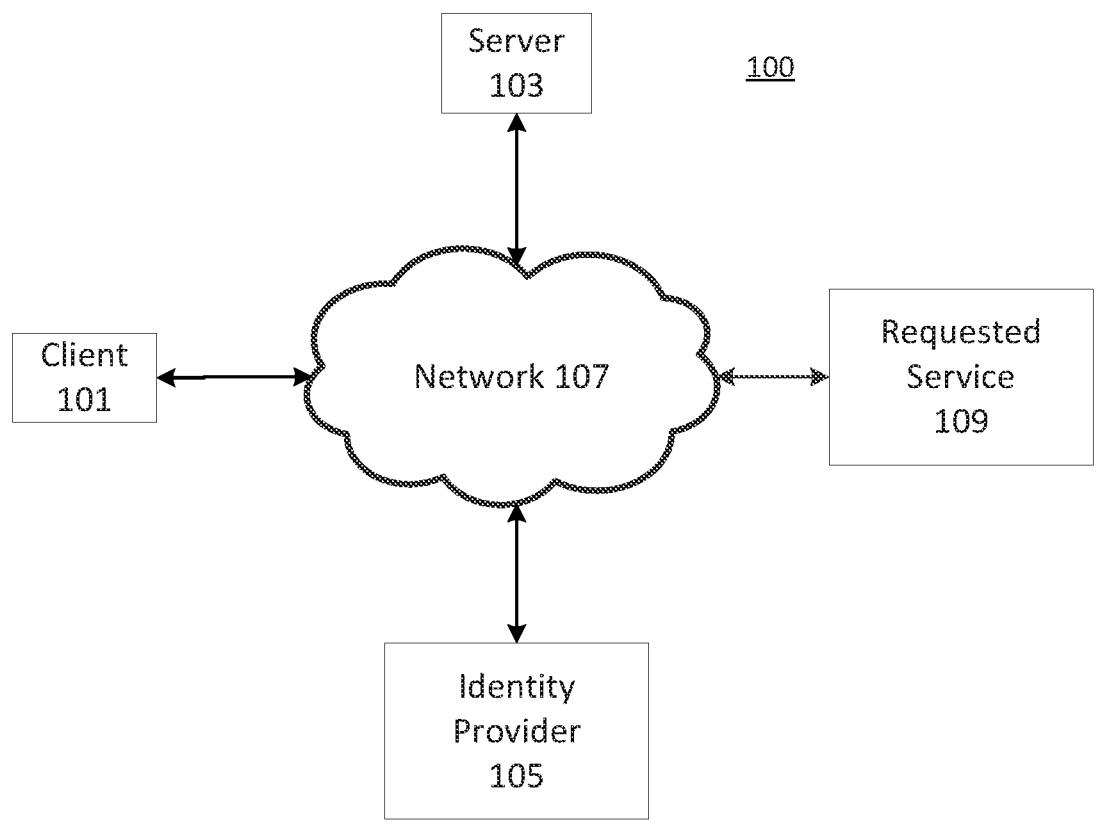
FIG. 1 depicts an exemplary system for web-based authentication of non-web clients in accordance with disclosed embodiments.

FIG. 1 depicts an exemplary system 100 for web-based authentication of non-web clients, consistent with disclosed embodiments. System 100 improves upon existing authentication methods by enabling authentication in computing environments involving multiple differing operating systems or underlying authentication protocols. According to disclosed embodiments, systems using differing non-web remote access clients can still participate in web-based federated authentication. As disclosed, this improvement is achieved at least in part by an unconventional integration of web-based and non-web based authentication methods. In some embodiments, system 100 can be configured to perform federated web-based authentication of a non-web-based client to a target machine using remote access control. In this manner, the non-web based remote access client to authenticate a server with web-based authentication. For example, while client 101 can be a non-web based client (e.g., an SSH client or RDP client), the federated authentication services can be web-based (e.g. SAML, OAuth2, OpenID Connect, etc). Upon completion of the web-based authentication flow, the system can provide identity information for a user associated with client 101 to a requested service 109. The particular structure of the identity information depends on the type of federated authentication service used (e.g. SAML, OAuth2, OpenID Connect, etc).

As shown in FIG. 1, system 100 can include client 101, server 103, identity provider 105, and requested service 109. Client 101 can be a non-web based authentication client, while identity provider 105 can be a web-based federated authentication service. Client 101, server 103, identity provider 105, and requested service 109 can communicate using network 107. As would be appreciated by one of skill in the art, the arrangement of components depicted in FIG. 1 is not intended to be limiting. In some embodiments, system 100 can include fewer components. For example, in some embodiments, one or more of client 101, server 103, and identity provider 105 can be hosted by the same computing device, or cloud computing platform (e.g., one the same or separate virtual machines, or in separate containers). In various embodiments, system 100 can include additional components (e.g., additional identity providers, password managers, or network resources).

Client 101 can be a non-web based authentication client hosted on one or more computing devices. For example, client 101 can be hosted on a mobile device, laptop, desktop, workstation, or computing cluster. Client 101 can be configured to use any non-web based interactive remote access protocol (e.g., SecureCRT, OpenSSH, MobaXterm, Telnet, Putty, MSTSC, etc.). Although in system 100 client 101 is non-web based, system 100 may also contain other clients, which may be web-based or non-web based.

Server 103 can be one or more computing devices configured to provide authentication services. For example, server 103 can be a laptop, desktop, workstation, or computing cluster. Server 103 can be a virtual machine, or a platform for executing containerized applications. In some embodiments, server 103 can be configured to provide authentication services for a collection of network resources. For example, server 103 can be configured to provide authentication services for the network resources on a network of an organization. In some embodiments, server 103 can be configured as a service provider, providing additional services beyond authentication (e.g., database storage, business logic, web frontend).

Identity provider 105 can be one or more computing devices configured to create, store, and/or manage identity information. For example, identity provider 105 can be a laptop, desktop, workstation, or computing cluster. Server 103 can be a virtual machine, or a platform for executing containerized applications. Identity provider 105 can be configured to provide identity information to a relying party application (e.g., an authentication application running on server 103). The relying party application can then use the identity information to authenticate a user. Identity provider 105 can be configured to provide this identity information in response to a request from the user, the relying party, or another system or application. In some embodiments, identity provider 105 can be configured to provide web-based authentication servers to relying party applications. For example, identity provider 105 can be configured to authenticate clients in a Windows-based environment. In various embodiments, identity provider 105 can be configured to authenticate clients in an SSH-based environment. In some embodiments, the identity provider is configured to authenticate clients in a Unix-based environment.

Network 107 may be any type of network that provides communications, exchanges information, and/or facilitates the exchange of information between client 101, server 103, identity provider 105, and/or requested service 109. In some embodiments, network 107 can include one or more wired networks or wireless networks. Network 107 can include a Local Area Network, Wide Area Network, a global computer network (e.g., the Internet), or other suitable connection(s) that enables system 100 to send and receive information between the components of system 100.

Requested service 109 may be any network-accessible resource requiring authentication, such as a server, database, instance of a virtual machine, instance of a docker container, remote application running on a computer device, IoT application, mobile application, etc.

Figure 2:
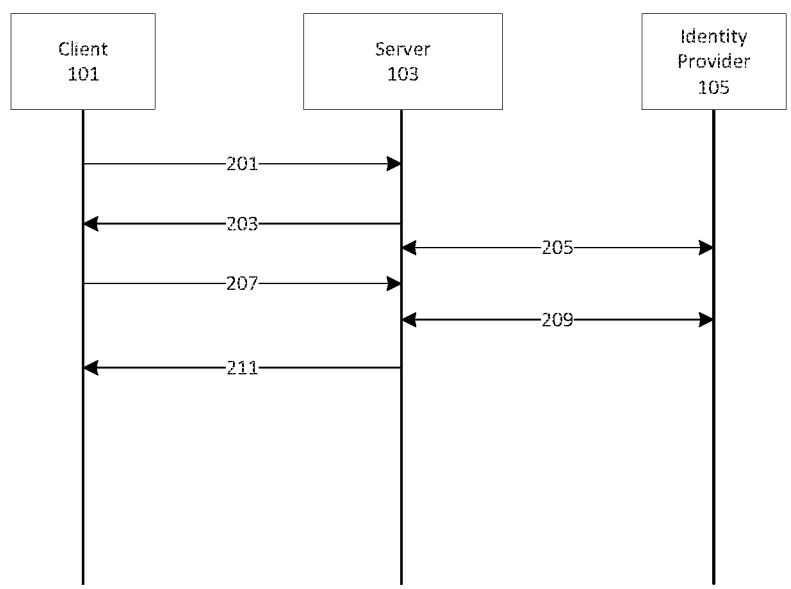
FIG. 2 depicts an exemplary communications flow for web-based authentication of non-web clients in accordance with disclosed embodiments.

FIG. 2 depicts an exemplary communications flow 200 for web-based authentication of non-web clients, consistent with disclosed embodiments. As depicted in FIG. 2, communications flow 200 can include operations performed by at least three systems: client 101, server 103, and identity provider 105. In some embodiments, server 103 can include authentication components. For example, in a Linux-based environment, server 103 can be configured to host an SSH daemon, which can be configured to listen for connections from users attempting to access server 103 (e.g., start a terminal session or execute commands on server 103). As an additional example, in a Windows-based environment, server 103 can be configured to host a credentials provider that describes and packages credential information necessary for authentication. As described herein, client 101 can interact with server 103, which in turn can interact with identity provider 105 to authenticate client 101.

As would be appreciated by one of skill in the art, the arrangement of components and operations depicted in FIG. 2 is not intended to be limiting. In some embodiments, communications flow 200 can include fewer operations. For example, in some embodiments, client 101 can be configured to provide authentication information to server 103 together with the authentication request. In such embodiments, server 103 may not be configured to reflect the display of the web navigation application to client 101. Communications flow 200 may therefore skip steps 203 and

207. In some embodiments, communications flow 200 may require additional operations. For example, as described below with regards to FIG. 3, additional operations may coordinate the interaction of applications running within server 103.

In step 201, server 103 can be configured to receive an authentication request, consistent with disclosed embodiments. The authentication request can concern a resource provided by server 103, or another system. For example, client 101 may request access to a database hosted by server 103, or to an application exposed by server 103. In some embodiments, this authentication request can be received using network 107. In response to receiving the authentication request, server 103 can be configured to start an application capable of performing web-based authentication.

In step 203, server 103 can be configured to reflect the user interface for the application to client 101. For example, when the application provides a text interface, this text interface can be reflected to client 101. For example, when client 101 is an SSH client, server 103 can be configured to provide instructions to client 101 to display a textual interface for the application. This textual interface can enable a user of client 101 to enter commands for remote execution by the application and observe results returned by the application. As an additional example, when the application provides a graphical user interface, this graphical user interface can be reflected to client 101. For example, when client 101 comprises a remote desktop protocol, server 103 can be configured to provide instructions to client 101 to display a graphical user interface of the application. This graphical interface can enable a user of client 101 to enter commands for remote execution by the application and observe results returned by the application.

In step 205, server 103 can be configured to communicate with identity provider 105. Server 103 can communicate with identity provider 105 over network 107. In some aspects, Server 103 can communicate with identity provider 105 using the application capable of performing web-based authentication. For example, the application can be configured to access a login URL of identity provider 105. In response, identity provider 105 can provide login instructions to the application. For example, identity provider 105 can provide instructions to display a login page. When server 103 is configured to reflect a user interface for the application to client 101, this login page can also be displayed by client 101.

In step 207, server 103 can be configured 10 receive authentication information from client 101. Such authentication information could include an authorization code (e.g., an authorization code as used in OAuth 2.0), a token, a certificate, a user name and password (e.g., as used in SAML), or various other types of authentication credentials. Server 103 can receive the authentication information through the reflected user interface of the application. For example, a user can interact with client 101 to send data and/or instructions specifying the authentication information to server 103.

In step 209, server 103 can be configured to communicate the authentication information to identity provider 105 in step 209. For example, when identity provider 107 is a OAuth 2.0 authentication server, server 103 can provide an authentication code to identity provider 107. As an additional example, when identity provider 107 is a SAML authorization server, server 103 can provide the user name and password to identity provider 107. Identity provider 105 can be configured to provide identity information for the client in response to the authentication information. In some embodiments, this identity information can include an SAML token. In some aspects, the identity information can include information about the user (e.g., user access privileges). In various embodiments, the identity information can include an OAuth access token. In some aspects, the identity information can be used to retrieve information about the user (e.g., user access privileges) from identity provider 105.

In step 213, server 103 can be configured to provide to client 101 an authentication indication. For example, based on the identity information (or optionally any additional information about the user retrieved using the identity information, server 103 can determine whether to grant client 101 access to requested service 109 (e.g., the database or application described above with regards to step 201).

In this manner, communications flow 200 can enable a non-web-based client 101 to use web-based authentication provided by identity provider 105 to access requested service 109 by using a non-web based connection to server 103.

Figure 3:
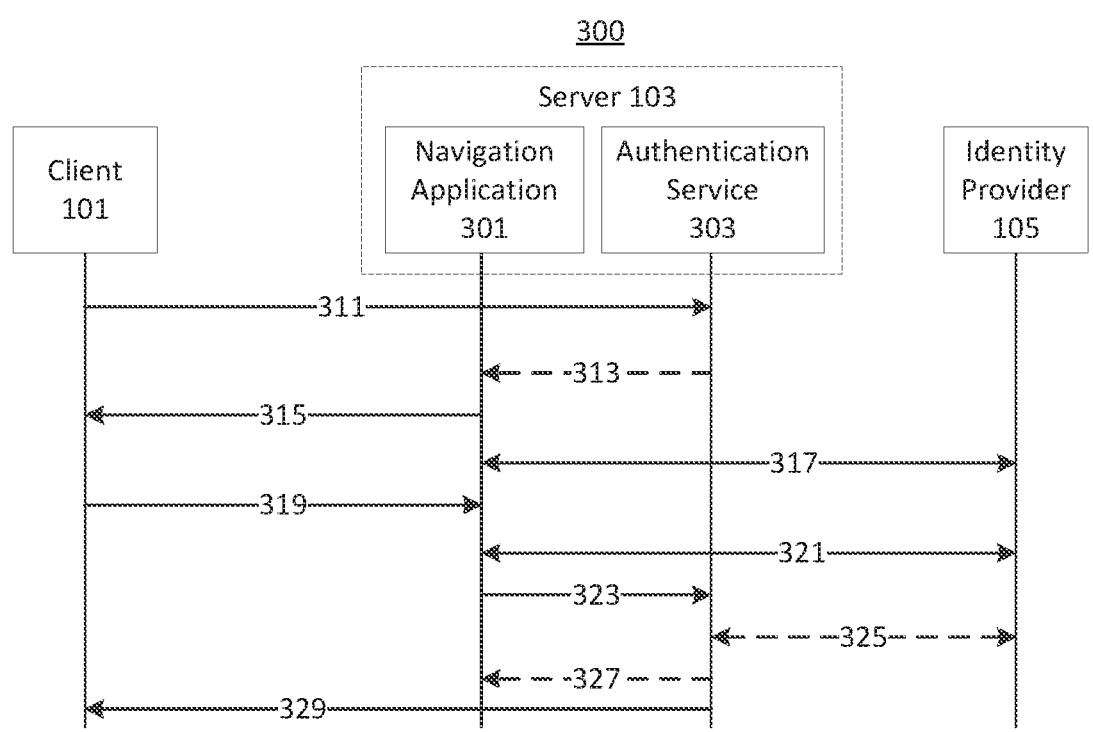
FIG. 3 depicts an exemplary communications flow for web-based authentication of non-web clients using a browser and an authentication service in accordance with disclosed embodiments.

FIG. 3 depicts an exemplary communications flow 300 for web-based authentication of non-web clients using a browser and an authentication service, consistent with disclosed embodiments. As shown in FIG. 3, server 103 can comprise a navigation application 301 and an authentication service 303. In some embodiments, authentication server 303 can be configured to use navigation application 301 to perform web-based authentication for client 101. As would be appreciated by one of skill in the art, the systems and operations depicted in FIG. 3 are not intended to be limiting. Consistent with disclosed embodiments, additional systems and operation may be present. For example, server 103 can be configured to act as a single sign on server for resources hosted on a particular network. In such an example, an access request from client 101 may be redirected to server 103 from another server. Likewise, fewer systems and operations may be present. For example, identity provider 105 may be part of server 103.

Navigation application 301 can be a web navigation application capable of accessing identity provider 105, consistent with disclosed embodiments. For example, navigation application 301 can be a web browser. In some aspects, the web browser can be executed on server 103 using a virtual machine or as a containerized application. In various aspects, the web browser can be executed in a restricted operating system environment that controls the resources (e.g., memory, file descriptors, system calls, etc.) that the web browser can use. For example, the web browser can be "sandboxed." Navigation application 301 can be a graphical browser or a textual browser, consistent with disclosed embodiments.

Authentication service 303 can be a program configured to provide local authentication services for one or more computing devices. In some aspects, these computing devices can be associated with a single organization. As a non-limiting example, authentication service 303 can be an SSH Daemon, a Windows credentials service, or a similar authentication service. Authentication server 303 could rely on passwords and usernames, PINS, access rules, access control lists, or other authorization methods to determine whether an authenticated client user may access a resource. In some embodiments, authentication service 303 may not be configured to authenticate a user associated with client 101. For example, the user associated with client 101 may lack a user account with authentication service 303. As an additional example, system 100 may be configured to rely on identity provider 107 to authenticate users requesting access to a particular requested service 109.

In step 311, authentication service 303 hosted by server 103 can receive a request from client 101. In some aspects, client 101 can be a non-web based client. The request can be a request to connect to a target resource. In some embodiments, in response to receiving the request, authentication service 303 can invoke navigation application 301 in optional step 313. In some embodiments, authentication service 303 can be configured to create, or cause server 103 to create, navigation application 301. For example, authentication service 303 can be configured to instantiate navigation application 301 on-demand in response to the request to connect to the target resource. As described above, navigation application 301 can be executed as a virtual machine or as a container instance. Authentication server 303 can therefore be configured to create, or cause server 103 to create, a virtual machine running navigation application 301 or a containerized instance of navigation application 301. In various embodiments, server 103 can be configured to maintain one or more instances of navigation application 301. In such embodiments, authentication service 303 can be configured to interact with an existing instance of navigation application 301, rather than creating a new instance.

In step 315, server 103 can reflect a user interface of navigation application 310 to client 101. For example, navigation application 301 can execute remotely from client 101 on server 103. Server 103 can be configured to transmit a display of navigation application 301 to client 101. In some aspects, the display of navigation application 301 can be provided to client 101 based on a remote access protocol. In various aspects, the remote access protocol used to connect client 101 and authorization service 303 can determine the navigation application used by communications flow 300. For example, when client 101 connects to server 103 using a textual connection protocol (e.g., SSH), server 103 can provide the user interface of a graphical browser to the client based on a remote windowing application (e.g., an X Window System protocol such as X11). Similarly, when using a remote desktop protocol like RDP, a graphical user interface of a graphical browser can be mirrored on client 101. Alternatively, when using a remote access protocol that does not support display of graphical user interfaces, server 103 can use a textual browser (e.g., lynx, elinks, etc.). The textual output of such a browser can be displayed by client 101. The remotely transmitted display of navigation application 301 can be configured to allow the user to provide information to navigation application 301. For example, when using a remote desktop protocol like RDP, a graphical display of navigation application 301 can include fields for the client to provide authentication information.

In step 317, navigation application 301 can communicate with identity provider 105. In some embodiments, navigation application 301 can communicate with identity provider 105 in response to instructions or directions received from authentication service 303. For example, authentication service 303 can be configured to provide location information for identity provider 105 to navigation application 301. This location information can include a uniform resource identifier, such as a URL. In some embodiments, navigation application 301 can be configured to provide information identifying authentication service 303. For example, navigation application 301 can provide a public identifier of authentication service 303 (e.g., an application id as used by OAuth 2.0). In some instances, navigation application 301 can provide a secret associated with authentication service 303. The public identifier and the secret (if used) can be used to authenticate authentication service 303.

In step 319, navigation application 301 can be configured to receive authentication information from client 101. As discussed above, with regards to step 315, server 103 can be configured to reflect a display of navigation application 301 to client 101. As navigation application 301 communicates with identity provider 105 in step 317, the user interface of navigation application 310 may show this communication. For example, navigation application 310 can access an authentication interface exposed by identity provider 105. Navigation application can be configured to display this authentication interface, and sever 103 can be configured to reflect this display to client 101. In some aspects, the authentication interface can be a login page. This login page can display elements enabling user to enter authentication information. A user can therefore enter authentication information into the reflected login page displayed by client 101. In some aspects, the authentication interface can be a confirmation page. The confirmation page can display controls that the user can select to indicate confirmation of the authentication request. A user can therefore confirm the authentication request by selected the controls in the reflected confirmation page displayed by client 101.

In step 321, navigation application 301 can communicate with identity provider 105. In some embodiments, navigation application 301 can be configured to provide the authentication information received from client 101 to identity provider 105. In some embodiments, navigation application 301 can be configured to use a tunneling protocol to convey the authentication information received from client 101 to identity provider 105. For example, navigation application 301 can be configured to use a VPN connection, HTTP Connect, or SSH to convey the authentication information received from client 101 to identity provider 105.

In response to the provided authentication information, navigation application 301 can receive an authentication result from identity provider 105. In some embodiments, the authentication result can include a redirect to the local host URL. Thus navigation application 301 can be redirected by identity provider 105 to a network service running on server 103 (e.g., authentication service 303). In various embodiments, the authentication result can include an access token or authentication code. In some embodiments, as described below, the local host can then request additional information from the identity provider.

In step 323, authentication service 303 can receive the authentication result. For example, as described above, navigation application 301 can be redirected to the local host URL. This redirection request can include a token (e.g., a SAML response) or authentication code (e.g., a OAuth 2.0 authentication code). Following receipt of the authentication result, authentication service 303 can be configured to validate the authentication result. The manner of validation can depend on the authentication protocol used by identity provider 107. For example, when the authentication result includes a token, authentication service 303 can validate a digital signature of the token, validate that the token is intended for authentication service 303, confirm that the token is not expired, and perform other validation steps in accordance with the authentication protocol used by identity provider 107. As an additional example, when the authentication result includes an authentication code, authentication service 303 can be configured to provide the authentication code to identity provider 107 (shown as step 325). In response to providing the authentication code, authentication service 303 can receive an access token from identity provider 107, validating the token. Authentication service 303 can also receive additional information regarding client 101 from identity provider 105, consistent with the authentication protocol used by identity provider 107.

In some embodiments, authentication service 303 can be configured to close, or cause server 103 to close, navigation application 301 in step 327, following validation of the authentication result. Alternatively, navigation application 301 may remain active to handle additional connection requests.

Authentication service 303 can be configured to provide an indication to client 101 based on the validation of the authentication result in step 329. As described above, navigation application 301 can be redirected by identity provider 105 to a network service running on server 103 (e.g., application service 303). Thus the determination of whether to permit the requested connection to requested service 109 can be performed at a local host corresponding to the local host uniform resource locator. In some embodiments, authentication service 303 can be configured to determine whether to permit the client to connect to requested service 109 based on the authentication result and any additional information received during validation of the authentication result. In some embodiments, authentication service 303 can be configured to send a redirect request client 101 with a uniform resource locator corresponding to requested service 109. In some aspects, the redirect request can include identity information for the client based on the authentication of the client. This identity information can enable client 101 to access requested service 109. For example, the redirect request can include the access token received from identity provider 105, or an access token generated by authentication service 303.

Figure 4:
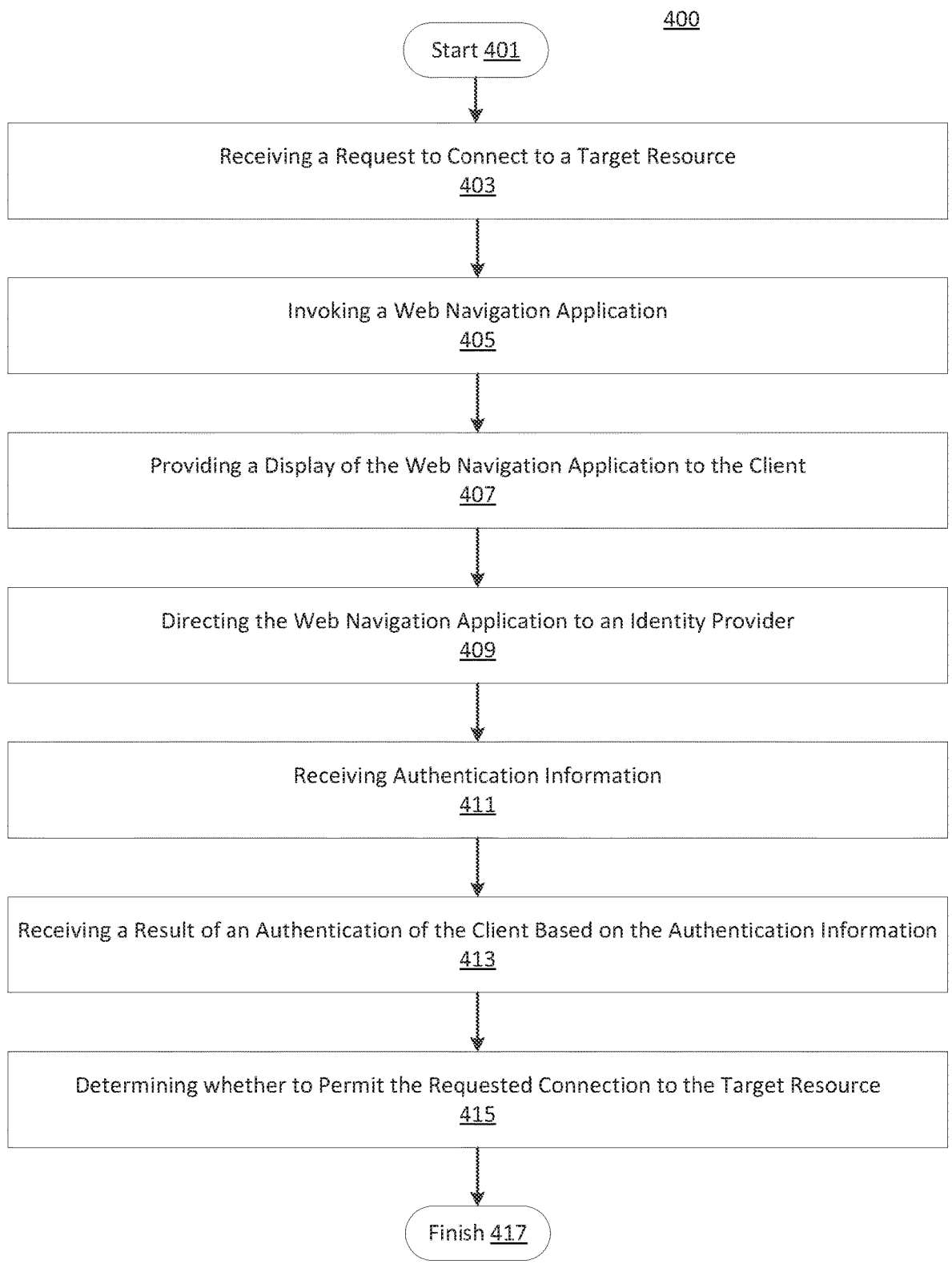
FIG. 4 illustrates an exemplary method for web-based authentication of non-web clients in accordance with disclosed embodiments.

FIG. 4 illustrates an exemplary process 400 for providing web-based authentication for non-web based clients. Process 400 can include receiving a request to connect to target resource (e.g., requested service 109), invoking a web navigation application (e.g., navigation application 301), providing a display of the web navigation application to the client (e.g., client 101), directing the web navigation application to an identity provider (e.g., identity provider 105), receiving authentication information, receiving a result of an authentication of the client based on the authentication information, and determining whether to permit the requested connection to the target resource.

After starting at step 401, process 400 can progress to step 403. In step 403, server 103 can receive a request to connect to a target resource. The request can be received from a non-web based client. The request can be received using a remote access protocol. In some aspects, the remote access protocol can be SSH, RDP, or another similar remote access protocol. The request can be received by an application hosted by server 103, such as a local access control application (example an SSH daemon or WINDOWS authentication service). For example, the request can be received by authentication service 303 (described above with regards to FIG. 3).

After step 403, process 400 can progress to step 405. In step 405, server 103 can invoke a web navigation application. In some embodiments, the web navigation application can be a web browser. The web browser can be a graphical browser or a textual browser. Server 103 can be configured to run the browser in a controlled execution environment. For example, server 103 can be configured to run the browser on a virtual machine or as a containerized application. In some embodiments, server 103 can be configured to run the browser in a "sandbox." In some embodiments, server 103 can invoke the web navigation application in response to instructions or commands from an application hosted on server 103, such as a local access control application. For example, authentication service 303 can invoke, or cause to be invoked, the web navigation application.

After step 405, process 400 can progress to step 407. In step 407, server 103 can provide a display of the web navigation application to the client. In some aspects, the display can be a graphical display. In various aspects the display can be a textual display. In some aspects, the web navigation application can execute remotely from the client on server 103. Server 103 can be configured to reflect the display of the web navigation application to the client. In some aspects, server 103 can be configured to establish the web navigation application as an X client of an X server residing on the client. The X server can provide display and input services to the web navigation application executing on server 103. In various aspects, the server 103 can be configured to provide the display of the web navigation application through a remote desktop session established by the client.

After step 405, process 400 can progress to step 409. In step 409, the web navigation application can be directed to an identity provider. In some aspects, the web navigation application can be directed by server 103 or a component of server 103. For example, a local access control application, such as authentication service 303 can be configured to direct the web navigation application an identity provider. In some aspects, the authentication server 303 can provide the web navigation application with a location of the identify provider, such as a URI. In some embodiments, the web navigation application can be directed to a log-in page of the identity provider. This log-in page can include controls and/or text fields for selecting and/or entering authentication information.

After step 409, process 400 can progress to step 411. In step 409, server 103 or a component of server 103 (e.g., the web navigation application) can receive authentication information. The authentication information can include an authorization code (e.g., an authorization code as used in OAuth 2.0), a token, a certificate, a user name and password (e.g., as used in SAML), or various other types of authentication credentials. The authentication information can be received from the client. The authentication information can be received in response to the display of the web navigation application at the client. For example, a user can interact with the client to provider the authentication information. As previously disclosed, the web navigation application can be directed to a log-in page of the identity provider. The user can interact with the client to log-in to the identity provider using the log-in page. In this manner, the web navigation application can convey input from the client to the identify provider.

After step 411, process 400 can progress to step 413. In step 413, server 103 or a component of server 103 (e.g., the web navigation application) can receive a result of an authentication of the client based on the authentication information. In some embodiments, the authentication result can be include a token (e.g., a SAML response) or authentication code (e.g., a OAuth 2.0 authentication code). In some embodiments, this authentication result can be received from the identity provider. In various embodiments, this authentication result can be provided by the identity provider and received from another system. In some embodiments, the authentication result can be received in the form of a redirect request or post request. The redirect or post request can be to the local host. Thus the local network service (e.g., authentication service 303) can receive the authentication result from the web navigation application. In some embodiments, the local network service can contact the identity provider to request additional information based on the authentication result (e.g., exchanging an authentication code for an authentication token).

After step 413, process 400 can progress to step 415. In step 415, server 103 or a component of server 103 (e.g., a local network service, authentication service 303, etc.) can determine whether to permit the requested connection to the target resource. This determination can proceed based on the authentication result. For example, when the authentication result is a SAML token, server 103 can perform validation steps including: validating a digital signature of the token, validating that the token is intended for authentication service 303, and confirming that the token is not expired. As an additional example, when the authentication result includes an OAuth 2.0 authentication code, server 103 can provide the authentication code to identity provider 107. In response to providing the authentication code, authentication service 303 can receive an access token from identity provider 107, validating the token. Server 103 can also receive additional information regarding client 101 from identity provider 105, consistent with the authentication protocol used by identity provider 107. Should server 103 determine to permit the requested connection to the target resource, then server 103 or a component of server 103 (e.g., authentication service 303) can be configured to provide an indication to the client based on the validation of the authentication result, as described above with regards to FIG. 3. Server 103 may also close the web navigation application. Alter step 415, process 400 can end at step 417.

EXAMPLES

The following non-limiting examples illustrate potential use cases of the disclosed systems and methods. In particular, these non-limiting example illustrate how the disclosed systems and methods provide a technological solution to the technological problem of authentication across different OS-based system environments.

As a first example, a user can interact with a client on a Unix-based system to request connection or access to a WINDOWS-based environment. The WINDOWS authentication service will reflect a sandboxed web browser to the client. The user can interact with the reflected browser to perform web-based authentication using an identity provider. The user can provide credentials to the identity provider—the WINDOWS authentication service is not responsible for tracking the authentication credentials of the user. The identity provider can provide a token or authentication code that the sandboxed web browser redirects to the WINDOWS authentication service, enabling the WINDOWS authentication service to authenticate the user and allow connection or access to the WINDOWS-based environment.

As a second example, a user can interact with a client in a SSH-based authentication protocol system environment can request connection or access to system implementing a SAML-based authentication protocol. The client can access an SSH daemon to authenticate the user to the system. The daemon can invoke a sandboxed web browser and use X Windows to pass the display of the web browser to the client. As described above, the user can then interact with the reflected web browser to perform web-based authentication using an identity provider.

As a third example, a user can interact with a client in a console-based system without graphics to request connection or access to a Unix-based environment. The client can access an SSH daemon to authenticate the user to the system. The daemon can invoke a sandboxed textual browser and reflect the browser to the terminal. The user can interact with the client to log in to the identity provider. The user will supply her authentication credentials and be redirected to local host to validate the authentication result. Based on the authentication results, the SSH daemon will determine whether to allow connection or access to the Unix-based environment.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A non-transitory computer readable medium including instructions that, when executed by at least one processor, cause the at least one processor to perform operations for providing web-based authentication for non-web based clients, the operations comprising:
   receive, from a non-web based client, at a server remote from the client, a request to connect to a target resource;
   initiate, in response to the request, a web navigation application for execution on the remote server;
   provide location information for an identity provider to the web navigation application;
   transmit, by the remote server for display on the client, a representation of a graphical user interface of the web navigation application, the graphical user interface comprising at least one of a login page or a confirmation page accessed from the identity provider by the web navigation application based on the location information;
   receive, from the client, in response to the display of the representation of the graphical user interface, authentication information input through the graphical user interface;
   receive, from the identity provider, a result of an authentication of the client based on the authentication information; and determine, based on the result of the authentication of the client, whether to permit the requested connection to the target resource.

2. The non-transitory computer readable medium of claim 1, wherein the web navigation application is a sandboxed web browser.

3. The non-transitory computer readable medium of claim 1, wherein the representation of the graphical user interface is transmitted for display on the client based on a remote access protocol.

4. The non-transitory computer readable medium of claim 1, wherein the representation of the graphical user interface is transmitted for display on the client based on an X Window System protocol.

5. The non-transitory computer readable medium of claim 1, wherein the web navigation application executes at the remote server and the representation of the graphical user interface is remotely transmitted to the client.

6. The non-transitory computer readable medium of claim 1, wherein the representation of the graphical user interface includes fields for the client to provide the authentication information.

7. The non-transitory computer readable medium of claim 1, wherein the operations further comprise sending the received authentication information to the identity provider via a tunnel.

8. The non-transitory computer readable medium of claim 1, wherein the identity provider is configured to authenticate clients in a Windows-based environment.

9. The non-transitory computer readable medium of claim 1, wherein the identity provider is configured to authenticate clients in an SSH-based environment.

10. The non-transitory computer readable medium of claim 1, wherein the identity provider is configured to authenticate clients in a Unix-based environment.

11. A computer-implemented method for providing web-based authentication for non-web based clients, the method comprising:
    receiving, from a non-web based client, at a server remote from the client, a request to connect to a target resource;
    initiating, in response to the request, a web navigation application for execution on the remote server;
    providing location information for an identity provider to the web navigation application;
    transmit, by the remote server for display on the client, a representation of a graphical user interface of the web navigation application, the graphical user interface comprising at least one of a login page or a confirmation page accessed from the identity provider by the web navigation application based on the location information;
    receiving, from the client, in response to the display of the representation of the graphical user interface, authentication information input through the graphical user interface;
    receiving, from the identity provider, a result of an authentication of the client based on the authentication information; and
    determining, based on the result of the authentication of the client, whether to permit the requested connection to the target resource.

12. The computer-implemented method of claim 11, wherein the web navigation application is instantiated on-demand in response to the request to connect to the target resource.

13. The computer-implemented method of claim 12, wherein the instantiated web navigation application is executed as a virtual machine instance.

14. The computer-implemented method of claim 12, wherein the instantiated web navigation application is executed as a container instance.

15. The computer-implemented method of claim 11, further comprising receiving, from the identity provider, a redirect to a local host uniform resource locator.

16. The computer-implemented method of claim 15, further comprising performing the determining of whether to permit the requested connection to the target resource at a local host corresponding to the local host uniform resource locator.

17. The computer-implemented method of claim 16, further comprising requesting, by the local host, additional information from the identity provider.

18. The computer-implemented method of claim 17, wherein the determining of whether to permit the requested connection to the target resource is based on the authentication result and the additional information.

19. The computer-implemented method of claim 11, further comprising sending a redirect to the client with a uniform resource locator corresponding to the target resource.

20. The computer-implemented method of claim 19, wherein the redirect includes identity information for the client based on the authentication of the client.

* * * * *